(12) United States Patent
Luzinov et al.

(10) Patent No.: US 7,261,938 B2
(45) Date of Patent: Aug. 28, 2007

(54) SURFACE MODIFICATION OF SUBSTRATES

(75) Inventors: Igor A. Luzinov, Central, SC (US); Killugudi L. Swaminatha Iyer, Clemson, SC (US); Viktor Z. Klep, Clemson, SC (US); Bogdan V. Zdyrko, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 11/345,360

(22) Filed: Feb. 1, 2006

(65) Prior Publication Data

US 2006/0154081 A1   Jul. 13, 2006

Related U.S. Application Data

(62) Division of application No. 10/773,120, filed on Feb. 5, 2004, now Pat. No. 7,026,014.

(60) Provisional application No. 60/446,004, filed on Feb. 7, 2003.

(51) Int. Cl.
*B32B 27/38* (2006.01)

(52) U.S. Cl. ............... 428/332; 428/336; 428/413; 428/414

(58) Field of Classification Search ............. 428/332, 428/413, 414
See application file for complete search history.

(56) References Cited

U.S. PATENT DOCUMENTS

| | | | |
|---|---|---|---|
| 3,951,815 A * | 4/1976 | Wrasidlo ............... 210/500.27 |
| 5,405,700 A | 4/1995 | Weinkauf et al. |
| 5,503,933 A | 4/1996 | Afeyan et al. |
| 5,527,618 A | 6/1996 | Graiver et al. |
| 5,726,733 A | 3/1998 | Lai et al. |
| 5,728,431 A | 3/1998 | Bergbreiter et al. |
| 5,869,127 A | 2/1999 | Zhong |
| 5,879,757 A | 3/1999 | Gutowski et al. |
| 5,922,161 A | 7/1999 | Wu et al. |
| 5,932,296 A | 8/1999 | Sluka et al. |
| 6,001,894 A | 12/1999 | Ottersbach et al. |
| 6,096,369 A | 8/2000 | Anders et al. |
| 6,126,776 A | 10/2000 | Glejbøl et al. |
| 6,306,506 B1 | 10/2001 | Timmons et al. |
| 6,358,557 B1 | 3/2002 | Wang et al. |
| 6,379,753 B1 | 4/2002 | Soane et al. |
| 6,649,672 B1 | 11/2003 | Dücoffre et al. |
| 6,672,210 B2 * | 1/2004 | Kawamura et al. ......... 101/457 |
| 6,706,320 B2 | 3/2004 | Filippou et al. |

FOREIGN PATENT DOCUMENTS

WO   WO9004609 A1   5/1990

* cited by examiner

*Primary Examiner*—Monique R. Jackson
(74) *Attorney, Agent, or Firm*—Dority & Manning, P A

(57) ABSTRACT

The present invention is directed to a practically universal surface modification process and the materials thereby obtained. In general, the process includes initial epoxy modification of a substrate surface by attachment of an epoxy-containing polymer to the surface. Following attachment of the polymer, still-existing epoxy groups on the polymer may then cross-link the polymer to form a unified anchoring layer on the surface. Other epoxy groups in the anchoring layer, not utilized in forming the layer may be used to graft surface modifying materials to the surface. For instance, macromolecules, biomolecules, polymers, and polymerization initiators may be grafted to the surface via the anchoring layer.

20 Claims, 5 Drawing Sheets

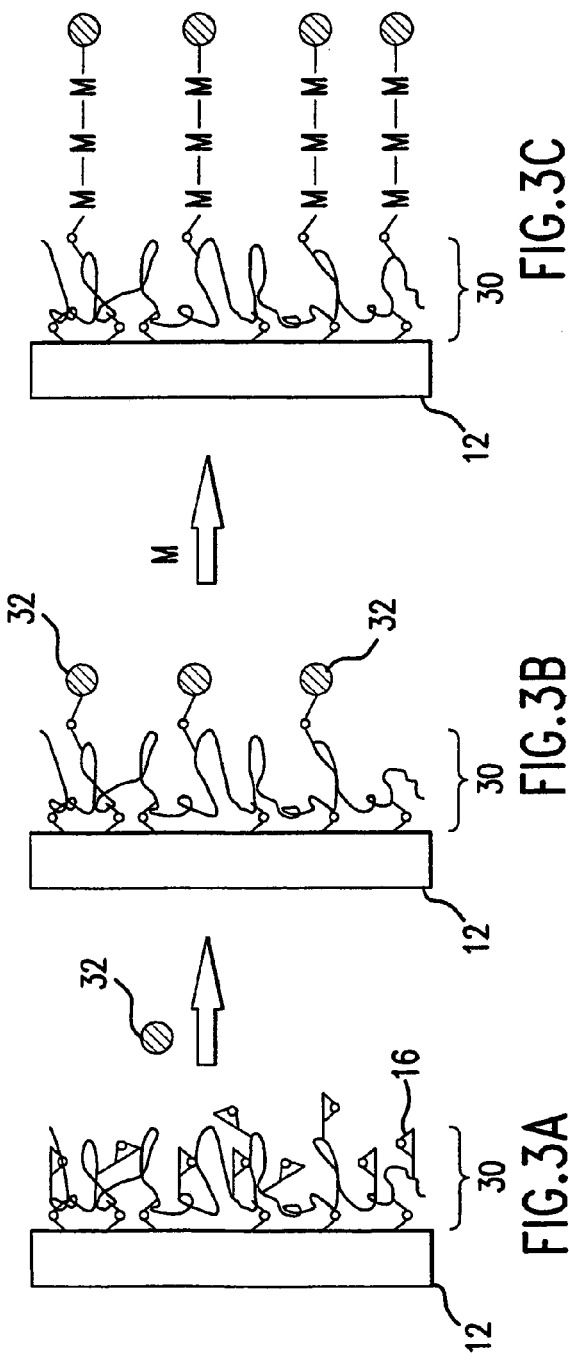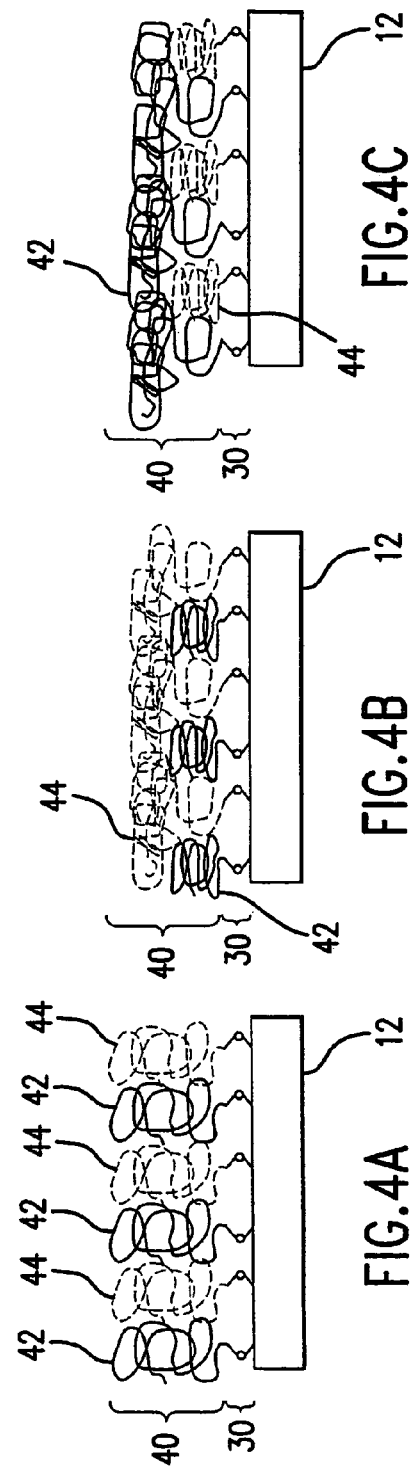

Contact angle 72°

Contact angle 70°

Contact angle 92°

SURFACE MODIFICATION OF SUBSTRATES

CROSS REFERENCE TO RELATED APPLICATIONS

This application is a divisional application of U.S. Ser. No. 10/773,120 filed Feb, 5, 2004, now U.S. Pat. No. 7,026,014 which claims benefit to U.S. Provisional Patent Application Ser. No. 60/446,004 filed Feb. 7, 2003.

BACKGROUND OF THE INVENTION

The surface characteristics of a substrate play a significant role in the ability of the substrate to perform as desired. For example, in many instances, a substrate has the preferred characteristics, e.g. strength, malleability, permeability, thermal dynamic characteristics, etc., for a desired use, but the surface characteristics present operational difficulties under the conditions of use. For example, surface characteristics of a substrate such as biocompatibility, wettability, reactivity, adhesion, resistance, colloidal stability, etc., may present processability problems under the conditions of use. As such, a large field of interest has developed in the modification of surface characteristics of substrates.

A wide variety of processes have been developed in an effort to create and/or modify specific surface characteristics of both organic and inorganic materials. However, these processes tend to be very specific to both the substrate material and the specific surface modification. For example, laminating processes are often used for surface modification of textiles. Other processes, such as surface activation followed by graft polymerization, are known for a variety of specific polymeric substrates. Still other surface modification techniques utilize various methods including vapor deposition, plasma activation, sputtering, chemical etching, ion implantation, self-assembled monolayer deposition etc. The feasibility of the specific method employed often depends upon both the substrate material as well as the specific surface characteristics sought by the modification.

What is needed in the art is a method for modifying the surface of a substrate that can be used on a wide variety of substrate materials. In addition, what is needed in the art is a method for modifying surfaces that can be used to obtain a wide variety of modifications. For example, what is needed in the art is a surface modification process that can not only be utilized for both organic and inorganic substrates, but can also be an efficient method for fixing a wide variety of functional materials to the various substrates. For example, a method that can be utilized to attach biomolecules, such as proteins, low molecular weight substances or polymeric substances to practically any substrate would be very useful in the art.

SUMMARY OF THE INVENTION

For purposes of this disclosure, the term 'graft' refers to a process wherein one material can be affixed to another material as herein described. For instance, materials may be considered to be grafted to one another according to any process known in the art including, for example, adsorption, absorption, bond formation (covalent, ionic, or any other bond type), polymerization, or any other method suitable to affix one material to another from melt, gas phase, or liquid phase, as desired.

In general, the present invention is directed to a process for modifying the surface characteristics of a substrate and the surface-modified substrates that can be formed according to the disclosed process.

In one embodiment, the process includes applying polymer comprising multiple epoxy groups and having a molecular weight of at least about 2000 to the surface of a substrate. A portion of the epoxy groups on the polymer can react at the surface binding the polymer to the surface at multiple points along the polymer. For instance, in one embodiment, the polymer can be covalently bound to the substrate surface at multiple points. In one embodiment, between about 5% and about 40% of the epoxy groups on the polymer can be utilized to bind the polymer to the substrate surface.

In addition, the polymer can be cross-linked to form a cross-linked polymeric anchoring layer bound to the substrate surface that contains additional epoxy functionality throughout the layer. More specifically, the polymer can be cross-linked with itself as well as with other polymers or low molecular weight substances deposited on the surface. In one embodiment, the polymer can be cross-linked at a portion of the epoxy groups on the polymer. For instance, between about 10% and about 40% of the epoxy groups on the polymer can be utilized to cross-link the polymer.

In one embodiment, the substrate can be heated to promote bonding and cross-linking of the epoxy-containing polymer. For instance, the substrate can be heated to a temperature of between about 70° C. and about 130° C.

In certain embodiments, it may be preferred to oxidize the surface of the substrate prior to application of the epoxy-containing polymer, so as to promote the attachment of the polymer to the substrate surface.

Any high molecular weight polymer containing multiple epoxy groups can be utilized in the disclosed process. For example, in various embodiments, epoxidized polybutadiene, epoxidized polyisoprene, or poly(glycidyl methacrylate) can be utilized to form the anchoring layer.

Similarly, the disclosed processes can be utilized with a vast number of different substrate types. For example, in certain embodiments, the disclosed processes can be utilized to modify the surface of woven or non-woven textile materials, natural or synthetic fibers, polymeric materials, or inorganic materials.

The epoxy-containing polymer forming the anchoring layer can be applied to the substrate surface according to any suitable process. For example, in one embodiment the polymer can be applied in a dip-coating process. In another embodiment, the polymer can be applied in a more controlled deposition process, in order to, for example, apply the polymer heterogeneously across the surface of the substrate.

In one embodiment, the anchoring layer can be formed on the substrate surface to a depth of at least about 0.5 nanometers. For example, the anchoring layer can be between about 1 and about 10 nanometers on the substrate surface. In another embodiment, the anchoring layer can be at least about 100 nanometers in depth on the substrate surface.

Following formation of the anchoring layer, additional material can be grafted to the substrate surface via the remaining epoxy functionality in the anchoring layer. For example, in one embodiment, a polymerization initiator can be grafted to the anchoring layer, and a monomer may then be polymerized on the anchoring layer. For example, vinyl aromatic monomers, acrylate monomers or methacrylate monomers can be polymerized on the substrate surface. Optionally, a material can be directly grafted to the substrate at the remaining epoxy functionality. For example, a polymer or other macromolecule, such as a biomolecule, for example, can be directly grafted to the substrate surface. In another embodiment, two or more different materials can be grafted to the substrate surface at the anchoring layer.

In one embodiment, the invention is directed to a 'smart' material that can be formed according to the disclosed processes. A smart material of the disclosed invention is one upon which two or more different materials have been grafted to the anchoring layer, and the two or more different materials can exhibit different responses to a known stimulus. For example, the two grafted materials can exhibit a different response from one another when stimulated by contact of a known agent, thermal energy, electromagnetic fields, or irradiation.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 3 describes one embodiment of a graft polymerization process according to the present invention;

FIGS. 4A, 4B, and 4C illustrate a hybrid polymer layer composed of two immiscible polymers grafted to an anchoring layer according to the process of the present invention;

Figure 1:
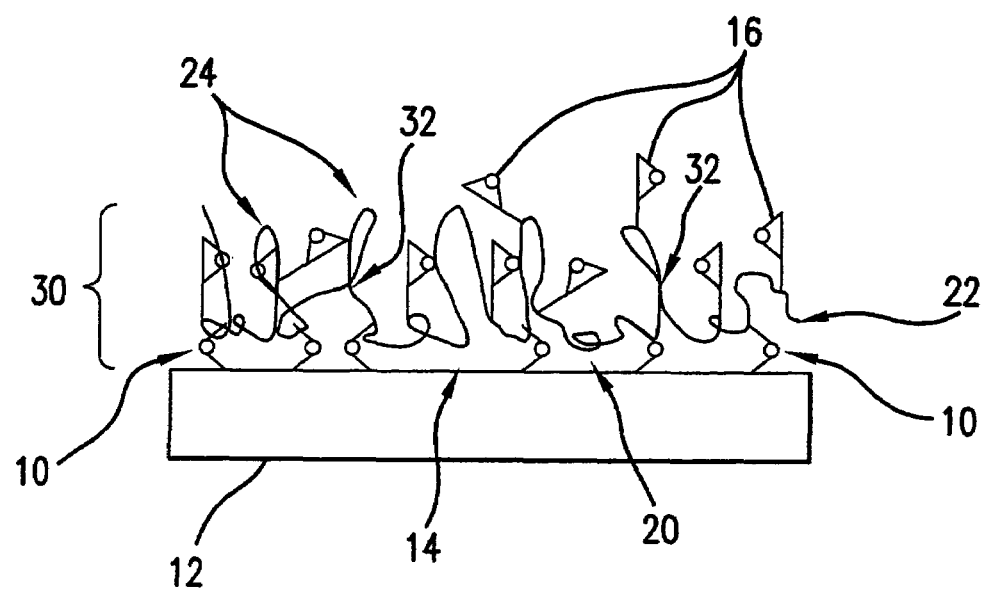
FIG. 1 is a representation of an epoxy-containing polymeric anchoring layer bonded to a substrate surface.

Repeat use of reference characters in the present specification and drawings is intended to represent the same or analogous features or elements of the present invention.

DETAILED DESCRIPTION OF THE INVENTION

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used in another embodiment to yield a still further embodiment. Thus, it is intended that the present invention cover such modifications and variations as come within the scope of the appended claims and their equivalents.

The present invention is generally directed to a nearly universally applicable process for modification of a substrate surface and the surface-modified substrates formed according to the disclosed processes. In particular, the surface modification processes of the present invention are suitable for almost any organic or inorganic substrate.

The present process generally includes the initial formation of an epoxy-containing polymeric layer on a surface. More specifically, according to the present invention, epoxy-containing polymers can be deposited on a surface and can be cross-linked or otherwise stabilized to form an epoxy-containing polymeric anchoring layer on the surface of a substrate. While many of the epoxy groups on the anchoring layer polymer can be utilized to firmly bind the polymers to the surface and to each other via cross-linking, a number of the epoxy groups can remain intact following formation of the anchoring layer. These remaining reactive epoxy groups can then be utilized for subsequent binding of additional materials to the surface of the substrate via the anchoring layer. For example, functional molecules, biomolecules, low molecular weight substances or polymeric substances can be bound to the substrate surface via the anchoring layer.

The disclosed surface modification processes may be utilized in a wide variety of applications. A non-limiting list of exemplary applications for surface modified products could include, for example, products displaying increased hydrophilicity, hydrophobicity, dirt repellency, adhesiveness (such as for inks or dyes), flame retardance, lubrication, membrane selectivity, molecular recognition, colloidal stability, dispersivity and solvent resistance. In addition, improved bonding capabilities of a surface in general may be attained through the disclosed surface modification processes. For example, in one embodiment, a specific bonding phase may be obtained by binding a partner of a specific binding pair to a surface. This modified surface can then be used in, for example, identification or filtering applications. In another embodiment, a surface, for example a metallic surface, may be modified to display increased corrosion resistance. Wettability characteristics of fibers and textile materials may be improved through surface modification so as to improve sizing, finishing and dyeing of the materials in addition to improved grease repellency, permanent press properties, and quickness of drying of the final products.

There are countless medical and biological applications for surface modified materials. For example, materials inserted into blood vessels, body cavities, eyes, etc. could be modified so as to be more hydrophilic, in order to increase lubricity or wettability of the materials. In some instances, it may be advantageous for surfaces of medical devices to have the capability to serve as a temporary or permanent depot for biomaterials such as various physiologically or pharmacologically active agents, such as antibacterial agents, for example. In addition, surfaces of biological materials can be modified so as to prevent thrombosis, or blood clotting at the surface following insertion.

Generally, any organic or inorganic material may be modified at a surface according to the present invention. In addition, though certain substrates, for example certain organic substrates, may require a pre-treatment process, most materials will already comprise suitable functionality at the surface to be processed according to the presently disclosed invention with no pre-treatment necessary. A non-exhaustive list of possible materials suitable for modification according to the processes of the present invention can include, for example, various fiber and textile materials, including natural and synthetic fibrous materials; polymeric materials, including polyolefins such as polyethylene and polypropylene based materials, including ultra high molecular weight polyethylene, polyethylene terephthalate (PET), silicon resins, and nylons; and inorganic materials including silicon, glass, and metal substrates such as titanium, alumina, gold, silver, and alloy materials. Moreover, when considering fibrous materials, the fibrous material itself may be treated according to the present invention. Alternatively, individual fibers may be treated according to the present invention prior to formation of a woven or nonwoven material.

According to the present invention, a polymeric anchoring layer can be deposited on a substrate surface. While the polymers used to form the anchoring layer can comprise multiple different functionalities, they will always include multiple epoxy functionality. Epoxy is highly reactive under a wide variety of conditions. For instance, epoxy can react with any of carboxy, hydroxy, amino, thiol, or anhydride functional groups under a wide variety of conditions. As such, the epoxy-containing polymers of the present invention can be readily bound to surfaces via functionalities already available on most substrates. In other words, pre-processing of a substrate prior to deposition and formation of the anchoring layer will not be required in many embodiments of the present invention. In addition, the particular bond formed between the substrate and the epoxy groups on the polymer can depend upon the functionality on the substrate and as such, the polymer may be bound via covalent bonds, hydrogen bonds, ionic bonds, or any other strong or weak bond, as desired.

Beneficially, the epoxy-containing polymers deposited on the surface can cross-link following or even during initial deposition. As such, the deposited epoxy-containing polymers can form a permanent or quasi-permanent layer on the substrate. Moreover, the polymers utilized to form the anchoring layer will include multiple epoxy functionality. Due to the multiple epoxy groups available on the polymers, the epoxy-containing polymers that form the anchoring layer of the present invention can form a consolidated, cross-linked anchoring layer that is firmly affixed to the substrate surface and still have large levels of additional reactive epoxy functionality remaining in the network following formation of the layer. This remaining epoxy functionality can provide a relatively simple route for subsequent surface modification of the substrate by the further reaction of the anchoring layer with additional materials to provide the desired surface characteristics on the substrate.

In general, epoxy-containing polymers suitable for the processes of the present invention include high molecular weight epoxy-containing polymers having a plurality of epoxy sites. For example, in one embodiment, an epoxy-containing polymer having a molecular weight of at least about 2,000 may be used to form the anchoring layer. In one embodiment, an epoxy-containing polymer having a molecular weight over about 100,000 may be utilized to form the anchoring layer on the substrate surface. In any case, the number of epoxy groups on the polymer will be at least 3 times higher than those in an epoxy resin. For purposes of this disclosure, epoxy resins are herein defined as low-molecular-weight pre-polymers or oligomers with typically from two to six epoxide groups per molecule Beneficially, there are a wide variety of epoxy-containing polymers already available in the art that can be utilized in the disclosed processes. As such, in one embodiment, an anchoring layer can be formed on a substrate surface with readily available materials according to the processes of the present invention. Optionally, the epoxy-containing polymers may be pre-functionalized or otherwise preprocessed according to any desired methodology as is known in the art to provide a specific epoxy-containing polymer for formation of the disclosed anchoring layer. For instance, in certain embodiments, the epoxy-containing polymer utilized to form the anchoring layer according to the present invention can include backbone material or side chain functionality so as to interact in a specific way with the substrate material or with materials that can be subsequently grafted to the anchoring layer. For example, in certain embodiments, an epoxy-containing polymer may be utilized which is miscible with the material to be subsequently grafted to the anchoring layer. In other instances, it may be preferable to utilize an epoxy-containing polymer which is immiscible with the subsequently grafted material.

In one embodiment, the epoxy-containing polymer can include one or more additional functionalities or moieties which can provide desired characteristics to the modified surfaces. Additionally, the epoxy-containing polymer can include additional functionalities or moieties that can be utilized in affixing additional materials to the substrate surface via specific or non-specific interactions with the anchoring layer. While not intending to be in any way a limiting list, exemplary moieties may include various hydrophobic or hydrophilic moieties as are generally known in the art including pyridine, tertiary amines, double bonds, chelates, protected amino, hydroxyl, thiol, and carboxyl functional groups.

In one embodiment, the epoxy-containing polymer that can form the anchoring layer can be epoxidized polybutadiene. In another embodiment, epoxidized polyisoprene can form the anchoring layer on the substrate surface. In another embodiment, poly(glycidyl methacrylate) (PGMA) can be used to form the anchoring layer. Generally, any epoxy-containing homopolymer or copolymer possessing about 10 or more oxyrane rings per polymer can be utilized for the anchoring layer formation. In other embodiments, the polymer can include greater epoxy functionality. For example, in one embodiment, the polymer can include one or more epoxy groups on each repeating unit of the polymer. In another embodiment, the polymer can be a block, graft, alternating, or random copolymer, in which at least one of the monomers found in the copolymer includes one or more epoxy functionalities on each monomer unit, while the other monomer(s) carry no epoxy functionality.

By utilizing a high molecular weight epoxy-containing polymer, it has been discovered that a large amount of the epoxy-containing material may be attached to the substrate surface in the anchoring layer thus formed. For example, by forming an anchoring layer of cross-linked PGMA with molecular weight of 24,000 g/mol on a silicon wafer substrate, the amount of material grafted to the anchoring layer can be from about 2 to about 4 times greater than the amount of polymeric material attached to the surface when a low molecular weight epoxy-containing substance with a single epoxy functionality, for example, epoxysilane ((3-glycidoxypropyl)trimethoxysilane) is utilized, which generally attains a graft density at maximum of about 0.3 chains/nm$^2$. In general, the high molecular weight epoxy-containing polymers of the disclosed invention can be grafted at a graft density greater than about 0.3 chains/nm$^2$. For example, between about 0.5 and about 1 chains/nm$^2$. In one embodiment, the polymer can be grafted at a grafting density of about 0.8 chains/nm$^2$.

The epoxy-containing polymer of the disclosed anchoring layer may be applied to the substrate surface according to any suitable methodology. For example, in one embodiment, a polymer solution may be formed and the substrate may be sprayed with or immersed in the polymer solution. In one embodiment, a fairly dilute solution of the polymer may be formed, and the substrate may be dip-coated in the solution.

For example, a solution may be formed containing from about 0.02% to about 0.5% of the polymer by weight in an organic solvent and the substrate may be dip-coated in the solution. In other embodiments, however, less dilute solutions of the polymer may be utilized.

When utilizing a formation method such as that described above, any suitable solvent may be used to form an epoxy-containing polymer solution. Generally, the solvent may be an organic solvent, such as, for example, tetrahydrofuran (THF) or a ketone-based solvent such as methyl-ethyl ketone. Optionally, aqueous or aqueous/alcoholic solutions are not outside the scope of the present invention, though an aqueous-based solution may present certain difficulties due to the tendency of the epoxy groups to hydrolyze in the presence of water. For instance, in certain embodiments, it may be preferable to utilize the polymer solution fairly soon after formation, with little storage time prior to use.

Generally, most surfaces will already contain suitable reactivity such that the epoxy-containing polymer may be bound to the surface with no pretreatment of the surface necessary. However, certain unreactive substrate surfaces may require pretreatment prior to formation of the anchoring layer on the surface. For example, some polymeric surfaces such as poly(ethylene terephthalate), polyethylene, and polypropylene surfaces may require functionalization such as oxidation of the surface prior to contact with the epoxy-containing polymer and formation of the anchoring layer on the substrate.

In those instances wherein pre-functionalization of the substrate surface is desired, functionalization may be obtained according to any suitable method. For example, the surface of an organic substrate may be oxidized through any suitable oxidation method including, but not limited to, corona discharge, chemical oxidation, flame treatment, plasma treatment, or UV radiation.

When the substrate is contacted with the epoxy-containing polymer, a fraction of the epoxy groups on the polymer can react with functional groups on the substrate surface and bind the epoxy-containing polymer to the surface. The attachment may involve a chemisorption or a physisorption of the polymer on the substrate surface, depending upon the materials involved. For example, in certain embodiments, it is believed that hydrogen bonds can form by reaction between functional groups on the surface of the substrate and epoxy groups on the polymer. In other embodiments, however, it is believed that covalent bonds can form between functional groups on the surface of the substrate and the epoxy groups on the polymer. More specifically, in certain embodiments, following attachment, the anchoring layer has been shown to remain firmly affixed to the substrate surface following vigorous solvent treatment such as solvent treatment with Dimethylformamid (DMF), Dimethyl sulfoxide (DMSO), tetrahydrofurane (THF), toluene, or methyl ethyl ketone, suggesting that the epoxy-containing polymer may be chemically bonded to the surface. Optionally, a less permanent attachment can be formed between the anchoring layer and the substrate surface, making the anchoring layer a temporary layer, such as in those embodiments wherein the desired surface modification is not meant to be a permanent feature of the substrate.

FIG. 1 illustrates one embodiment of an anchoring layer generally 30 according to the present invention. As can be seen in FIG. 1, a single epoxy-containing polymer can be grafted to the surface 14 of the substrate 12 at multiple points 10 along the length of the polymer where epoxy groups 16 of the polymer have reacted with functionalities on the surface 14 of the substrate 12. In this manner, a secure attachment can be formed between the epoxy-containing polymer and the substrate surface 14. In addition, as the epoxy-containing polymer can be attached to the substrate surface at multiple random points 10 along the length of the polymer, the individual polymer can form trains 20, tails 22, and loops 24 that can extend the height of the polymer above the substrate surface providing a depth to the anchoring layer 30, as can be seen in FIG. 1.

The epoxy-containing polymers applied to the surface of the substrate that form the anchoring layer of the present invention include excess quantities of epoxy functionality on the polymer in addition to those used for attachment of the polymer to the substrate surface. As such, in addition to binding the polymer to the substrate surface, the epoxy functionality on the polymer can cross-link the polymers. For instance, as can be see in FIG. 1, the polymer can form cross-links 32 to self-cross-link a single polymer as well as to cross-link adjacent polymers to each other. The epoxy-containing polymers applied to the substrate can thus form a permanent or quasi-permanent anchoring layer on the substrate.

In one embodiment, the polymers can spontaneously cross-link simultaneous with the attachment reactions as the polymers are bound to the surface. In another embodiment, the epoxy-containing polymers may be encouraged to cross-link through addition of energy, such as thermal or radiant energy. In yet another alternative embodiment, the epoxy-containing polymers can cross-link during subsequent grafting processes. Additionally, combinations of cross-linking protocols may take place. In any case, according to the presently disclosed process, a cross-linked epoxy-containing polymeric network can be formed on at least a portion of the substrate surface creating an anchoring layer on at least that portion of the surface.

For example, in one embodiment, the polymers can cross-link. According to one possible self-cross linking protocol, attachment of the epoxy-containing polymer to the surface through epoxy ring opening can generate hydroxyl groups in the glycidyl fragment. In addition, minor occurrence of opened epoxy rings can be present on the polymer due to traces of water in the environment. At some point, such as during an annealing process, for example, these hydroxyl groups can react with another epoxy ring yielding a cross-link having an ether linkage and can also generate a new hydroxyl group in the polymer that is able to initiate further cross-linking. Moreover, in one embodiment, a cross-linking agent can be included with the polymer solution to further encourage cross-linking of the polymer. In general, a cross-linking agent can be any compound bearing two or more moieties able to react with epoxy ring. For example, ethylene diamine, hydrazine, dicarboxylic acids and the like can be utilized.

In some embodiments, heat may be added to the system in order to speed up the anchoring layer forming reactions on the substrate surface. For example, in one embodiment, the rates of both the cross-linking reactions and the substrate attachment reactions can be increased by heating the substrate before, during, or after contact with the epoxy-containing polymer to a temperature of between about 40° C. and about 150° C. In one embodiment, following the coating process, the substrate can then be heated and held for about 5 minutes at a temperature of about 100° C. to promote both the attachment and cross-linking reactions that can form the anchoring layer on the substrate surface.

Following attachment and cross-linking of the epoxy-containing polymer on the surface of a substrate, the polymeric anchoring layer can still include an amount of reactive epoxy that can be utilized for attachment of additional materials to the anchoring layer. For example, in one embodiment of the present invention, between about 10% and about 30% of the epoxy groups on an epoxy-containing polymer can react with surface functionalities and form attachment points between the polymer and the substrate surface. In addition, between about 10% and about 40% of the epoxy groups on the polymer can be utilized in cross-linking the layer. The remaining epoxy groups on the epoxy-containing layer, between about 20% and about 50% in some embodiments, can still remain within the anchoring layer following formation of the cross-linked anchoring layer on the substrate surface and can be available for subsequent attachment of additional materials to the surface of the substrate.

Beneficially, the thickness of the anchoring layer and, consequently, the amount of epoxy functionality remaining on the substrate surface following formation of the anchoring layer, may be controlled according to the presently disclosed process by varying process conditions. For example, in one embodiment, the thickness of the anchoring layer may be modified by varying the solvent employed and/or the concentration of the epoxy-containing polymer solution during deposition. In one embodiment, the thickness of the anchoring layer can depend on the planarity of the substrate surface. By varying process conditions of the deposition, a predetermined and wide variety of anchoring layer thickness can be formed. For example, in certain embodiments, an epoxy-containing anchoring layer may be formed on a substrate surface of up to or even greater than about 100 nm. In one embodiment, an anchoring layer with a thickness of at least about 0.5 nm may be formed according to the disclosed process. In another embodiment, an anchoring layer with a thickness from about 1 nm to about 10 nm may be formed according to the disclosed process.

The anchoring layer formed according to the processes of the present invention can be smooth and, in one embodiment, can uniformly cover the surface of a substrate. For instance, in one embodiment the anchoring layer can cover the entire surface of a substrate, for example when a dip-coating application method is used to form the layer. Alternatively, the anchoring layer may cover only a portion of a substrate surface. For example, in certain embodiments of the present invention, the anchoring layer may be heterogeneous across the substrate surface such as in a pattern, such that only a portion of the surface includes the anchoring layer. Heterogeneous coverage of the substrate surface can, in one embodiment, be attained by more controlled methods of deposition for applying the epoxy-containing polymer to the substrate, such as spraying or printing processes, for example.

Following formation of an anchoring layer on a substrate surface according to the processes herein described, additional materials may be grafted to the substrate surface by reaction with the epoxy functionality still remaining in the anchoring layer. For instance, in one embodiment, functionalized polymers or macromolecules such as biomolecules (proteins, DNA, or polysaccharides), polyethylene glycol, polyacrylates, polymethacrylates, poly(vinyl pyridine), polyacrylamide, or polystyrene may be directly grafted to the epoxy-containing anchoring layer.

In general, it has been found that the thickness of the formed anchoring layer can have little or no decisive influence on the amount of material that can be subsequently grafted to the substrate surface in those embodiments wherein the materials to be grafted to the substrate surface are immiscible with the epoxy-containing polymer. However, in those embodiments wherein materials are to be grafted that are miscible with the epoxy-containing polymer, the grafted amount can be strongly dependent on the anchoring layer thickness. This is believed to be due to the ability of a miscible material to penetrate the depth of the anchoring layer and react with available epoxy throughout the layer, allowing material to be grafted throughout the layer, and not just on the surface of the layer, as would be the case for an immiscible material.

Figure 2:
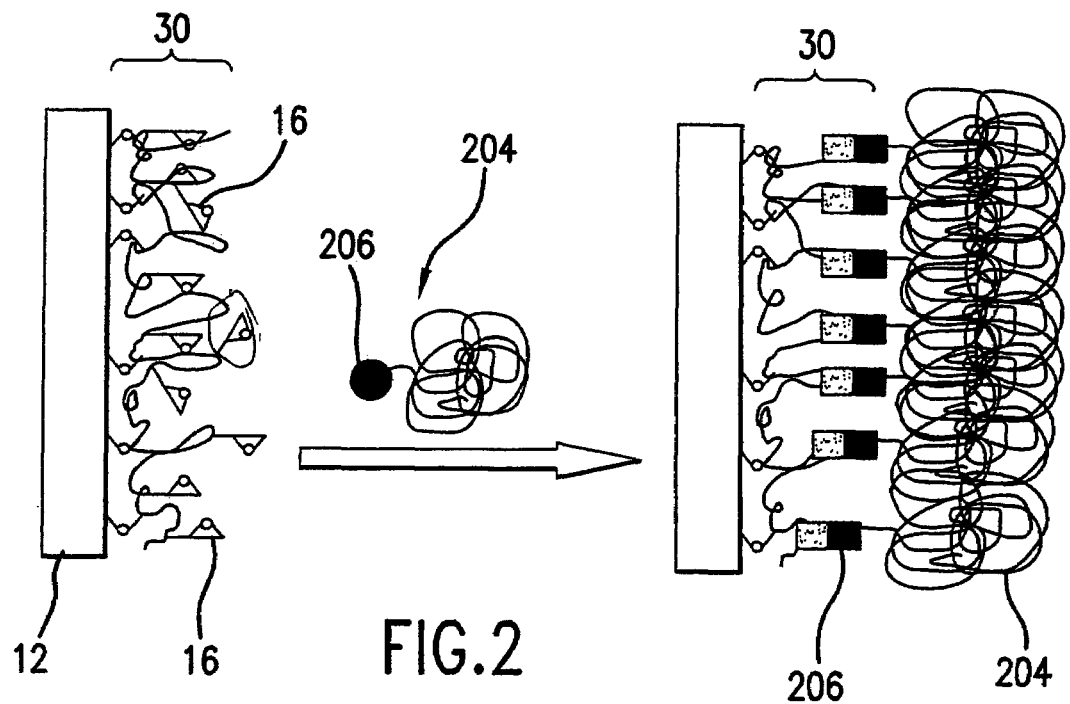
FIG. 2 is a representation of one method for grafting functionalized polymers to an epoxy-containing anchoring layer on a substrate according to the present invention.

In one embodiment, materials may be grafted to the anchoring layer by direct reaction between the material and the epoxy functionality remaining on the substrate surface following formation of the anchoring layer. FIG. 2 illustrates one embodiment of the present invention in which a macromolecule 204 possessing any of several different possible functional groups 206, e.g., carboxy, anhydride, amino and/or hydroxy groups, may be directly grafted to the epoxy-containing anchoring layer 30 on the surface of a substrate 12. In this embodiment, the macromolecule 204 can be attached to the anchoring layer 30 at those functional groups 206 where the macromolecule 204 can react with free epoxy groups 16 in the anchoring layer 30. For example, in various embodiments, hydrophobic and hydrophilic homopolymers (polyethylene glycol, polyacrylates, polkymethacrylates, poly(vinyl pyridine), polyacrylamide or polystyrene), random, graft, or block copolymers may be attached to the substrate surface via direct attachment to the anchoring layer.

In another embodiment illustrated in FIGS. 3A-3C, a grafted material may be 'grown' on the anchoring layer such as through a graft polymerization process. In this embodiment, a graft polymerization initiator 32 can be grafted to the anchoring layer 30 at epoxy groups 16 as shown in FIG. 3B. Subsequent contact between the substrate 12 carrying the polymerization initiator 32 and monomer M at reaction conditions can lead to the polymerization of the monomer M on the substrate surface via the anchoring layer 30 as shown at FIG. 3C. In general, the polymerization initiating groups can be grafted to the anchoring layer via covalent bond-forming reactions with the epoxy groups, though this is not a requirement of the present invention.

Though not wishing to be bound by any particular theory, it is believed that the unique three dimensional network of the anchoring layer of the present invention including reactive epoxy throughout the layer can allow for very large amounts of material to be grafted to the surface of a substrate. For example, when considering a graft polymerization process such as that described above, it is believed that large amounts of individual polymerization initiator molecules can penetrate the cross-linked network of the anchoring layer easily to reach reactive epoxy groups across the entire depth of the anchoring layer. In addition, monomer molecules can also penetrate the cross-linked network of the anchoring layer to reach the polymerization initiators grafted within the anchoring layer. Therefore, polymerization can occur not just on the surface of the anchoring layer, but throughout the entire depth of the anchoring layer as well, and significantly larger amounts of polymeric material up to about 1000 mg/m$^2$ in one embodiment may be grafted on the substrate surface.

According to one embodiment of the present invention, a polymerization initiator for an Atom Transfer Radical Polymerization (ATRP), as is generally known in the art, may be grafted to the anchoring layer. Following or concurrent with attachment of the initiator, the substrate can be contacted with monomer, and polymerization can be initiated from the substrate surface via the anchoring layer. Thus, a polymeric layer possessing high grafting density, for example up to about 2 chains/nm² in one embodiment, may be synthesized on the substrate surface via the anchoring layer.

Various polymerization initiators may be utilized in a graft polymerization modification process according to the present invention. In one embodiment, an acid may be used such as, for example, bromoacetic acid, which can be grafted to the free epoxy groups of the anchoring layer at the carboxylic functionality. Other polymerization initiators may be alternatively utilized, however. For instance, any polymerization initiator displaying carboxy, anhydride, amino, or hydroxy functionality that may graft to the epoxy-containing anchoring layer may be utilized. Monomers which may be polymerized on the surface of the substrate from the polymerization initiator are generally well known in the art and include, for example, vinyl aromatic compounds including, for example, styrene and 2-vinylpyridine, acrylates, or methacrylates can be polymerized. In general, any vinyl monomer that may polymerize by radical polymerization employing the initiator according to any known polymerization process as is generally known in the art may be utilized.

In one embodiment of the present invention, the substrate can be grafted with two or more different materials at the anchoring layer to form a hybrid material. For example, the substrate, following formation of the anchoring layer, can be contacted with two or more different materials, either at the same time or in a step-by-step process, as desired, such that the materials may be either directly grafted or polymerized onto the epoxy-containing anchoring layer. For example, one material may be directly grafted and another material may be grafted through a polymerization process. Alternatively, all of the grafted materials may be grafted through the same process, i.e., direct grafting of the materials or graft polymerization. For example, in one embodiment, a first initiating system may be attached at some of the epoxy groups, followed by a graft polymerization process. Then, a second initiating system may be attached to the remaining epoxy sites on the substrate surface and a second graft polymerization reaction may be carried out.

In one embodiment, hybrid materials can be formed according to the invention wherein the graft area for each different material can be controlled. Alternatively, a hybrid material can be formed with all of the different grafted materials spread across the substrate in a mixed fashion. For instance, in one embodiment, a first material can be grafted to a portion of the substrate surface, while the rest of the surface is prevented from reacting with the first material, such as with a mask. Following grafting of the first material, a second material can then be applied to the previously masked areas. In another embodiment, the substrate surface carrying the disclosed anchoring layer can be contacted with two or more materials at one time, and all of the grafted materials may be located across the entire anchoring layer, in a mixed fashion.

According to one particular embodiment of the present invention, a hybrid material including two or more different materials grafted to a substrate surface via the disclosed anchoring layer can be formed to produce a 'smart' material.

'Smart' materials are herein defined to be materials possessing the ability to switch and/or display varying properties by application of variation in external stimuli. For example, one embodiment of a smart material of the present invention is a binary (hybrid) polymeric grafted layer composed of two immiscible polymers as can be seen in FIG. 4. In this embodiment, two different polymers 42, 44 have been grafted to substrate 12 via anchoring layer 30. Due to phase segregation, the morphology of the mixed polymer layer 40 can be sensitive to the surrounding medium. For instance, the hybrid layer 40 can be switched between different surface energetic states illustrated at FIGS. 4B and 4C upon exposure to different stimuli such as different solvents, different field energies, and the like. The differentiating stimuli can be of any type, including radiant, mechanical, thermal, electrical, magnetic, or chemical stimulation. The interaction of the binary polymer layer with changing external stimulation can cause a change of the surface properties of the polymer film due to the differing response of the grafted materials 44, 42 to the stimulation. For example, a hybrid surface layer 40 can be switched between different states, e.g. demonstrating different levels of hydrophilicity, adhesion, conductivity, or interaction with some substance depending upon the conditions of the substrate and the variation in response to those conditions of the different materials forming the hybrid layer 40. Moreover, hybrid layers of the present invention are not limited to binary systems. Multiple materials may be grafted to the substrate surface according to the processes of the present invention.

Reference now will be made to various embodiments of the invention, one or more examples of which are set forth below. Each example is provided by way of explanation of the invention, not as a limitation of the invention. In fact, it will be apparent to those skilled in the art that various modifications and variations may be made of this invention without departing from the scope or spirit of the invention.

EXAMPLE 1

The process of the present invention was utilized for direct attachment of polymers to polymeric surfaces. Hydrophilic poly(ethylene glycol) (PEG) and hydrophobic polystyrene (PS) polymers were directly grafted to polyethylene terephthalate (PET), polyethylene, and polysiloxane substrates via an epoxy-containing PGMA anchoring layer.

Initially, the polymeric substrates were plasma treated for short time. The plasma treated surfaces were then dip coated with PGMA ($M_n$=24,000 g/mol) from 0.05% solution in MEK (methyl ethyl ketone). The epoxy modified substrates were then grafted with carboxy end-functionalized PS and PEG at 130° C. and 70° C. respectively, in a vacuum oven. The unbound polymer was removed by multiple washing with toluene, including washing in an ultrasonic bath.

Figure 5A:
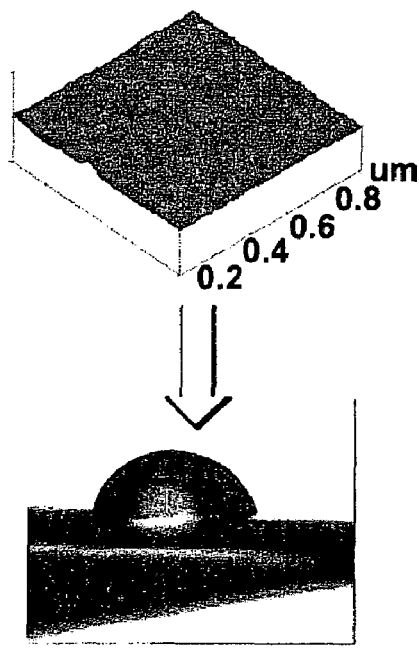
FIGS. 5A, 5B, and 5C illustrate the wettability characteristics of exemplary materials processed according to the processes of the present invention.
Figure 5B:
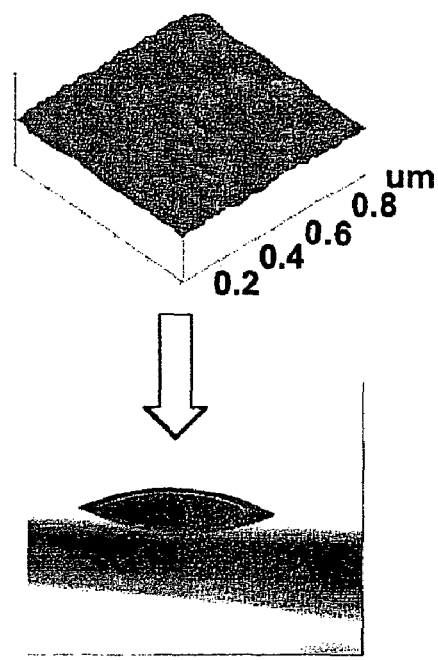

FIG. 5A illustrates the morphology and wettability of a PET surface modified with a PS layer. FIG. 5B illustrates the morphology and wettability of a PET surface modified with a PEG layer. The scanning probe microscopy images (1×1 µm), a portion of which is illustrated in FIGS. 5A and 5B, show that the polymeric surfaces were completely covered with the grafted layers. The polymer graft dictated the surface properties of the polymer film. The synthesized layers could not be removed by multiple rinsing in hot solvents including such strong solvent as DMF (Dimethylformamid). The obtained results show that polymers possessing functional groups may be grafted to polymeric surfaces modified with a PGMA anchoring layer.

Figure 5C:
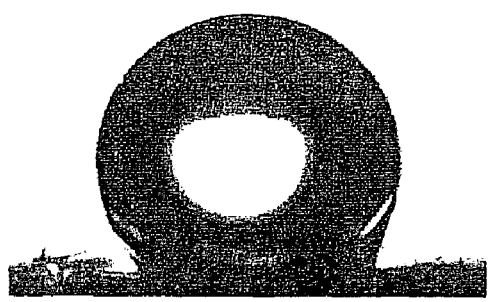

PEG and PS were also successfully grafted to polyester fiber and textile materials utilizing the processes of the present invention according to the above-described process. FIG. 5C illustrates a droplet of water on the surface of a polyester textile material modified with a grafted polystyrene layer via an epoxy-containing PGMA anchoring layer.

EXAMPLE 2

In this example, polymerization was initiated on a silicon wafer surface containing an anchoring layer of the present invention. FIG. 3 illustrates the process of the example. As shown in FIG. 3a, an anchoring layer 30 of PGMA with epoxy functionality was deposited on the surface of the substrate 12, a silicon wafer. Bromoacetic acid (BAA) was used as an initiator 32 of Atom Transfer Radical Polymerization (ATRP). The BAA initiator was attached to the PGMA anchoring layer from gas phase through the reaction between carboxylic and epoxy functionalities. The deposition was performed at a variety of different temperatures as was the subsequent polymerization process. Temperatures ranged for both processes from about 30° C. to about 115° C.

Figure 7:
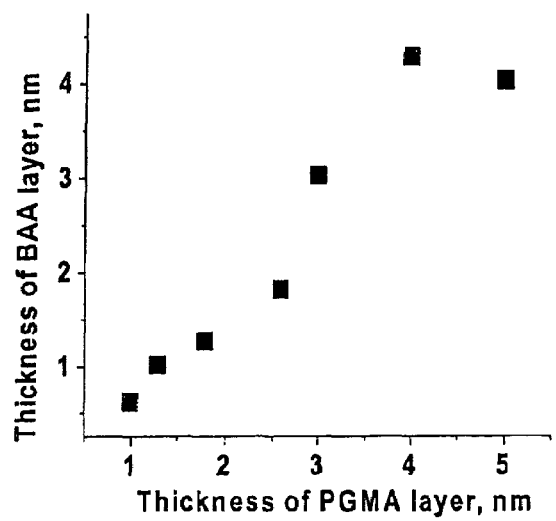
FIG. 7 graphically illustrates the variation in thickness of a layer of bromoacetic acid (BAA) affixed to a surface as a function of the thickness of an anchoring layer formed of poly(glycidyl methacrylate) (PGMA)

In various runs, carried out over 24 hours at 80° C., the PGMA layer thickness was varied, which allowed control over the amount of BAA initiator attached to the surface. FIG. 7 graphically illustrates the thickness of the BAA layer obtained as a function of the thickness of the anchoring PGMA layer. As can be seen, there was a nearly linear correlation between the quantity of the epoxy polymer attached to the surface and amount of the initiator grafted. Moreover, kinetics of the BAA initiator deposition process were also found to be suitable for regulation of the BAA amount reacted with the primary PGMA anchoring layer. As such, it was possible to regulate not only the amount of BAA deposited on the substrate but also numbers of remaining epoxy groups following formation of the PGMA/BAA layer.

Figure 8:
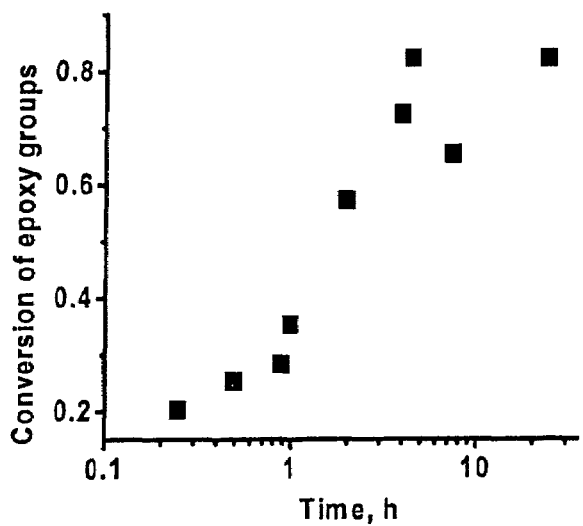
FIG. 8 illustrates the conversion of the anchoring layer epoxy groups over time as a polymeric layer is deposited on a substrate surface via the anchoring layer.

During attachment of BAA initiator, two competitive reactions may occur: (a) reaction between a carboxy group of BAA and an epoxy group of PGMA and (b) self-cross-linking of the PGMA layer owing to the high concentration of epoxy groups. The second reaction may decrease the surface concentration of the epoxy groups available for other reactions. FIG. 8 graphically illustrates the conversion of the PGMA epoxy groups as a function of time during BAA deposition at 90° C.

Further, to study the extent of the potential deactivation of available epoxy, dodecyl amine (DA) was grafted to PGMA films annealed at 120° C. for different periods of time to induce cross-linking of the PGMA film. This low molecular weight substance was used as a probe for the presence of accessible epoxy groups. The amine attachment was carried out in warm (40° C.) toluene solution for 8 hours. Data obtained showed that approximately 40% of epoxy groups were still available on the surface of the PGMA film after 4 hours of annealing and that the drop in initial activity of the PGMA film due to annealing occurred almost immediately when the film was heated.

Upon reaction between the PGMA anchoring layer and the BAA polymerization initiator, the silicon wafer became coated with a layer of the PGMA/BAA macroinitiator at a surface. The layer was found to be smooth, homogeneous and uniformly covered the surface of the wafer.

Figure 9:
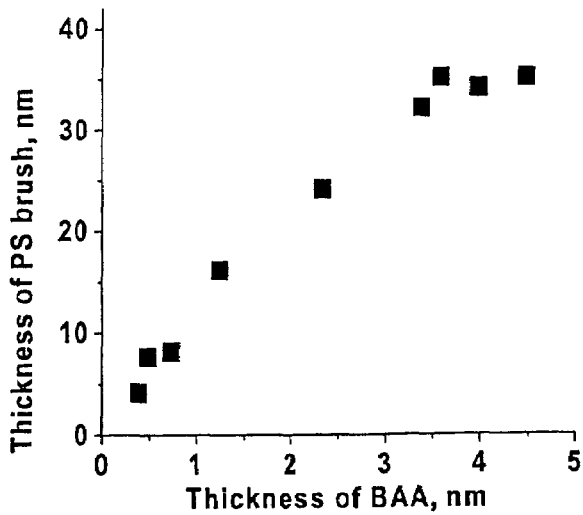
FIG. 9 illustrates the thickness of a polystyrene (PS) brush grafted to the surface of a substrate as a function of the thickness of a BAA-polymerization initiator layer.

Following formation of the PGMA/BAA macroinitiator layer, the surface of the wafer was further modified via ATRP of styrene. As a result of the polymerization, a polystyrene layer was firmly grafted to the surface of the wafer. FIG. 9 graphically illustrates the thickness of the polystyrene brush obtained via graft polymerization as a function of the thickness of the BAA layer applied to the wafer. The ATRP reactions illustrated in FIG. 9 were carried out at 115° C. for 8 hours.

Figure 6A:
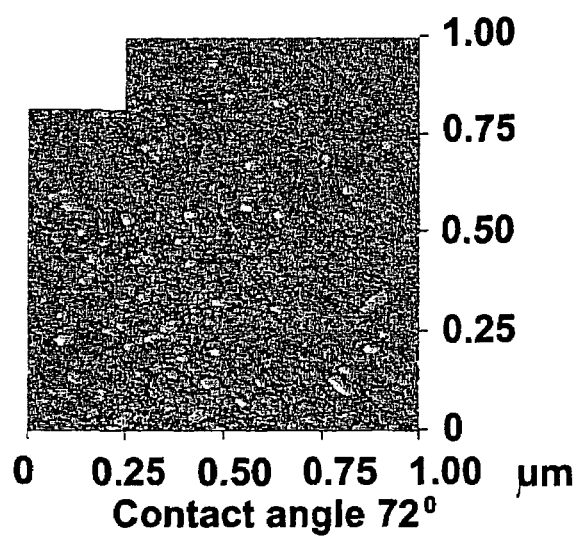
FIGS. 6A, 6B, and 6C are a series of scanning probe microscopy phase images obtained during a graft polymerization process according to the present invention.
Figure 6B:
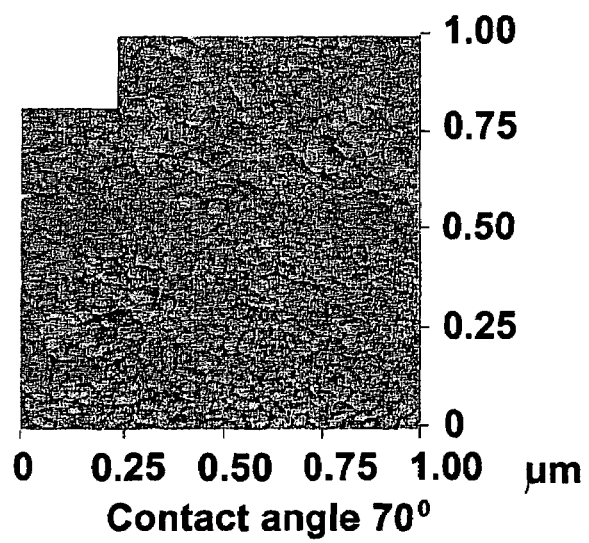
Figure 6C:
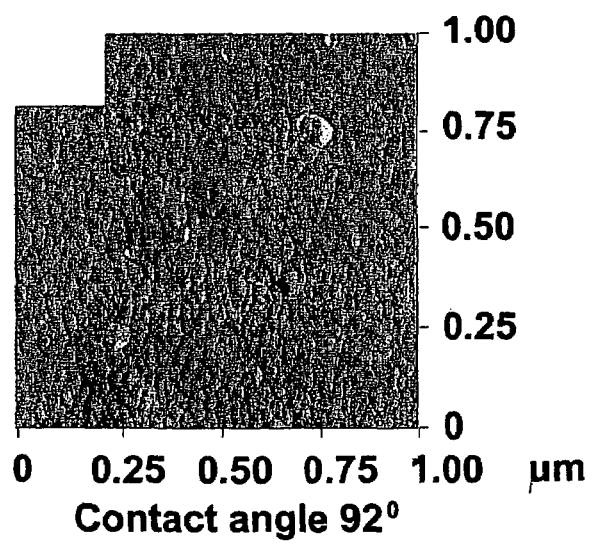

The same polymerization process was also utilized for polymerization of a polystyrene layer on a polymeric substrate. FIG. 6 shows SPM images and values of water contact angles for virgin PET surface (FIG. 6a), PET surface covered with PGMA/BAA combination (FIG. 6b), and the grafted polystyrene layer (FIG. 6c). One can see that the surface morphology of the PET film was changed after the polymerization.

EXAMPLE 3

Hybrid polymer layers of varying composition including grafted polystyrene (PS) and poly(2-vinylpyridine) (PVP) were formed on a PET textile material. The layers were synthesized by grafting the polymers to an epoxy-containing anchoring layer which had been formed according to the process of Example 1, above. FIG. 4 is a representation of the process.

Using PGMA as an anchoring layer, a switchable polymer nanolayer was formed on the surface of a polyester textile material including polystyrene and poly(2-vinylpyridine). It was found that the surface properties of the PET fabric changed after being treated with different solvents. When the fabric was exposed to toluene, the polystyrene chains preferentially occupied the surface of the substrate, thus, the substrate surface became hydrophobic and upon subsequent contact with water, the water did not penetrate through the material. Conversely, when the fabric was exposed to ethanol, the PVP chains preferentially occupied the surface of the substrate, and upon subsequent contact with water, the water did penetrate throughout the PET textile material.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention which is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:
1. A surface modified substrate comprising;
   a substrate defining a surface wherein the substrate is formed from a substrate material; and
   a cross-linked polymeric anchoring layer bonded directly to the substrate material at the substrate surface, wherein the anchoring layer comprises polymers having a number average molecular weight of at least about 2000 bound directly to the substrate material at the substrate surface at multiple points along each polymer, wherein said polymers are bound directly to the substrate material via epoxy groups of the polymers, wherein said polymers are cross-linked at multiple points along the length of each polymer, wherein at least a portion of said cross-links comprises the residue of an epoxy group of the polymer, the anchoring layer further comprising at least one of reactive epoxy groups and a second material bound to the anchoring layer via epoxy groups of the polymers, wherein the anchoring layer has a graft density on the substrate surface of at least about 0.3 chains per square nanometer.

2. The surface modified substrate of claim 1, wherein the anchoring layer is covalently bound directly to the substrate material, wherein said covalent bonds comprise the residues of epoxy groups of the polymers.

3. The surface modified substrate of claim 1, wherein the anchoring layer is at least 0.5 nanometers in depth on the substrate surface.

4. The surface modified substrate of claim 1, wherein the anchoring layer is between about 1 nm and about 10 nm in depth on the substrate surface.

5. The surface modified substrate of claim 1, wherein the anchoring layer is at least about 100 nm in depth on the substrate surface.

6. The surface modified substrate of claim 1, wherein the second material comprises a polymer.

7. The surface modified substrate of claim 6, wherein the second polymeric material is grafted to the anchoring layer at a graft density of up to about 2 chains/nm$^2$.

8. The surface modified substrate of claim 1, wherein the second material comprises a biomaterial.

9. The surface modified substrate of claim 1, wherein the second material comprises a macromolecule.

10. The surface modified substrate of claim 1, further comprising a third material grafted to the anchoring layer.

11. The surface modified substrate of claim 1, wherein the substrate material is a woven or nonwoven textile material.

12. The surface modified substrate of claim 1, wherein the substrate material is a natural or synthetic fiber.

13. The surface modified substrate of claim 1, wherein the substrate material is a polymeric material.

14. The surface modified substrate of claim 1, wherein the substrate material is an inorganic material.

15. A smart material comprising:
    a substrate defining a surface wherein the substrate is formed from a substrate material;
    a cross-linked polymeric anchoring layer bonded directly to the substrate material at the substrate surface, wherein the anchoring layer comprises polymers having a number average molecular weight of at least about 2000 bound directly to the substrate material at the substrate surface at multiple points along each polymer, wherein said polymers are bound directly to the substrate material via epoxy groups of the polymers, wherein said polymers are cross-linked at multiple points along the length of each polymer, wherein at least a portion of said cross-links comprises the residue of an epoxy group of the polymer, wherein the anchoring layer has a graft density on the substrate surface of at least about 0.3 chains per square nanometer;
    a first material grafted to the anchoring layer via epoxy groups of the polymers; and
    a second material grafted to the anchoring layer via epoxy groups of the polymers, wherein the first material and the second material display a response different from one another upon application of a known stimulus.

16. The smart material of claim 15, wherein the known stimulus is chemical stimulation.

17. The smart material of claim 15, wherein the known stimulus is radiant, mechanical, thermal, electrical, magnetic, or chemical stimulation.

18. The smart material of claim 15, wherein at least one of the first and second material is a polymeric material.

19. The smart material of claim 15, wherein at least one of the first and second material comprises a macromolecule.

20. The smart material of claim 15, wherein at least one of the first and second material comprises a biomolecule.

* * * * *